FIG. I

INVENTOR.
RUDOLF F. WILD
ROBERT B. DARNIELLE
BY
CBSpangenberg
ATTORNEY.

*INVENTOR.*
RUDOLF F. WILD
ROBERT B. DARNIELLE
BY
*CBSpangenberg*
ATTORNEY.

Feb. 7, 1950     R. F. WILD ET AL     2,497,051
CHATTER-FREE TORQUE AMPLIFIER
Filed Aug. 12, 1944     3 Sheets-Sheet 3

*INVENTOR.*
RUDOLF F. WILD
ROBERT B. DARNIELLE
BY
*ATTORNEY.*

Patented Feb. 7, 1950

2,497,051

UNITED STATES PATENT OFFICE 2,497,051

CHATTER-FREE TORQUE AMPLIFIER

Rudolf F. Wild and Robert B. Darnielle, Philadelphia, Pa., assignors, by mesne assignments, to Minneapolis-Honeywell Regulator Company, Minneapolis, Minn., a corporation of Delaware Application August 12, 1944, Serial No. 549,206

11 Claims. (Cl. 318—31)

A general object of the present invention is to provide improvements resulting in the elimination of over-shooting and consequent chatter, that is mechanical oscillation, in torque amplifying systems of the so-called follow-up type comprising two relatively rotatable condenser members, one of which is the low torque element and the other of which is the high torque element driven by the follow-up motor.

The present invention has especial utility in connection with sensitive follow-up condenser systems of the frequency discriminating type disclosed in the copending application Serial No. 537,505 filed on May 26, 1944 by R. F. Wild. Due to the nature of the frequency discriminators employed in such systems, maximum sensitivity is obtained in the vicinity of the balanced point of the torque amplifier system. This factor, together with the inertia of the rotating element of the follow-up motor, establishes a condition favoring over-shooting of the balanced point and consequent initiation of motor drive in the reverse direction. Accordingly, there is a tendency for the occurrence of sustained chattering of the rotating element of the motor and the parts driven thereby.

It is a primary object of the present invention to provide simple and efficient means for eliminating or at least minimizing the tendency for the occurrence of such motor chatter in torque amplifying systems of the type above described. This end is attained by effectively reducing the sensitivity of the system in the vicinity of the balanced point and by increasing the sensitivity upon increasing deviation from the balanced point. In particular, the desired end is obtained by proper configuration of the follow-up condenser.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
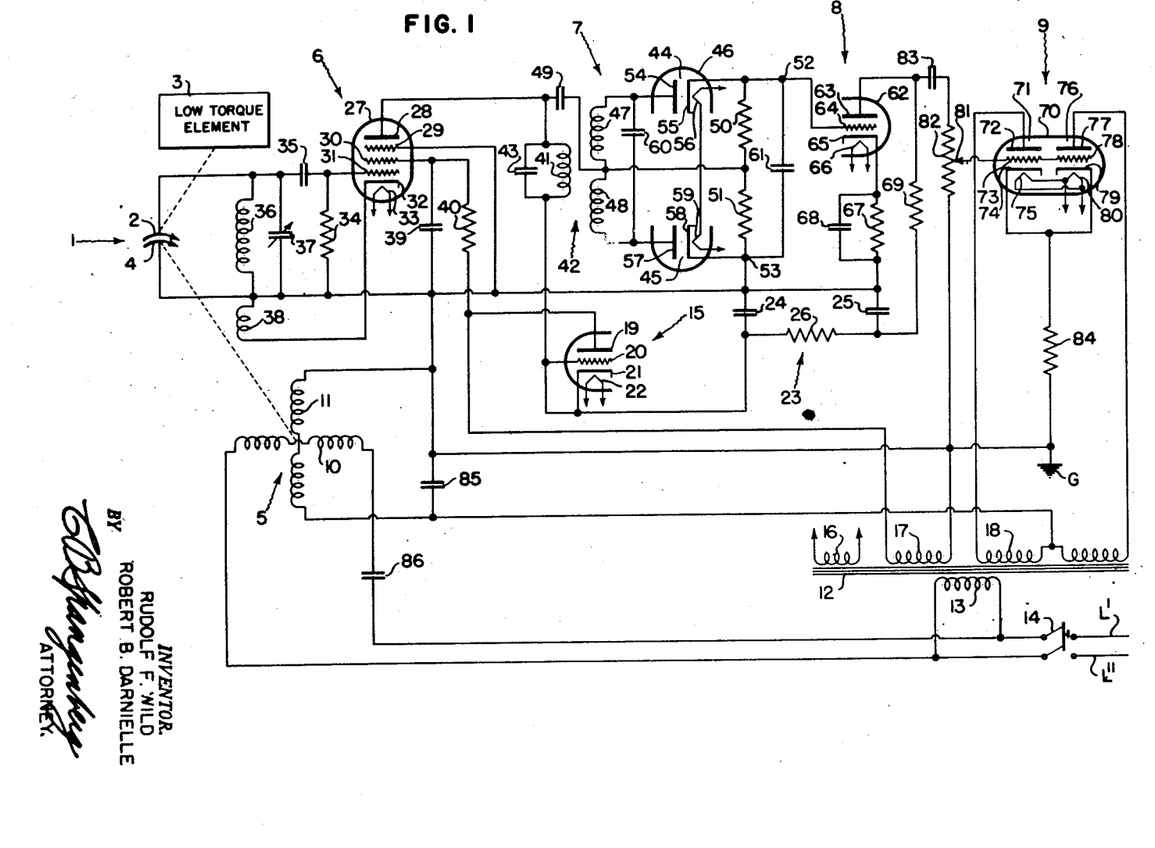
Fig. 1 is a diagrammatic illustration of a torque amplifying system in which the principles of the present invention may be advantageously incorporated to eliminate or minimize chattering.

In Fig. 1 we have illustrated, more or less diagrammatically, a torque amplifying system comprising a follow-up condenser 1 having a plate 2 which is rotatable and is angularly adjustable in position by a low torque element designated by the numeral 3. The low torque element 3 may comprise a sensitive and delicate rotatable shaft which may be maintained in rotation either intermittently or continuously, and the variations in the angular position of which it is desired to closely and accurately transmit to a high torque element. The high torque element is provided with a condenser plate 4 which is disposed in cooperative relation with the condenser plate 2 and is angularly adjusted in position relatively to the latter by a reversible electrical motor designated at 5. To this end the condenser plate 4 desirably is mechanically connected in any convenient manner to the shaft of motor 5. The mechanical connection may be a direct connection or may include gears and/or cable and associated pulley mechanism as disclosed in the aforementioned appliction of R. F. Wild.

The follow-up condenser 1 is electrically connected to and is arranged to control the operation of electronic apparatus to be described. That electronic apparatus includes an oscillator 6, frequency discriminating means 7, a voltage amplifier 8, and a power amplifier 9, and is arranged to control the selective energization for rotation in one direction or the other of the reversible electrical motor 5. As shown, the motor 5 is of the rotating field induction type. In addition to angularly adjusting in position the condenser plate 4, the motor 5 may also be employed to angularly adjust another rotatable element (not shown) the angular position of which it is desired to have correspond closely to the angular position of the low torque element 3.

The reversible motor 5 includes a stator (not shown) which is provided with suitable pole pieces and a rotor (also not shown) which is equipped with suitable conductor bars. A power winding 10 is wrapped around opposite pole pieces of the stator and a control winding 11 is wound around others of the motor pole pieces. Depending upon the phase relation of the electrical current flow through the power winding to that through the control winding, as is more fully explained hereinafter, the rotor and thereby the shaft of the motor is actuated for rotation in one direction or the other to cause a change in the angular position of the condenser plate 4. Moreover, the speed of rotation of the motor is proportional to the amplitude of the current flow through the control winding. The amplitude of current flow through the motor control winding, in turn, is dependent upon the extent of deviation from a predetermined position relatively to each other of the condenser plates 2 and 4. Accordingly, when the rotation of the condenser plate 2 driven by the low torque element is continuous at a fixed or varying speed, the following condenser plate 4 driven by motor 5 will be driven at a corresponding speed to maintain a predetermined angular relation between the two condenser plates.

Electrical energy is supplied to the electronic apparatus from alternating current supply lines L' and L" by means of a transformer indicated at 12 and having a line voltage primary winding 13, the terminals of which are connected by a switch 14 to the supply lines L' and L". The supply lines L' and L" supply alternating current of commercial frequency, for example, 60 cycles per second. Direct current energizing voltage derived from the supply lines L' and L" by means of the transformer 12 and a half wave rectifier 15 is supplied to the oscillator 6 and the voltage amplifier 8. As shown, the transformer 12 is provided with low voltage secondary windings 16 and 17 and a center tapped high voltage secondary winding 18 in addition to the primary winding 13. The low voltage secondary winding 16 is utilized to supply energizing current to the heater filaments of the various electronic space discharge devices employed in the electronic apparatus.

Follow-up condenser 1 is connected in the frequency determining circuit of the oscillator 6 and is employed to control the frequency of oscillation thereof. The high frequency oscillating current output of the oscillator 6 is amplitude modulated at the relatively low frequency of the voltage supplied by the alternating current supply lines L' and L" by means including the transformer secondary winding 17. Changes in the frequency of oscillation of the amplitude modulated high frequency current flow in the output circuit of the oscillator 6 are detected by the frequency discriminating means 7 which, as will become evident as the description proceeds, is operative to create a fluctuating or undulating output voltage of the same frequency as the voltage of the supply lines L' and L" when the frequency of oscillation of the oscillator output current does not correspond to the frequency to which the discriminating means 7 is tuned.

Moreover, the fluctuating output voltage so created is of one phase or of the opposite phase relatively to the voltage of the supply lines L' and L", depending upon whether the frequency of the oscillator output current is higher or lower than the frequency to which the frequency discriminating means 7 is tuned. The fluctuating discriminator output voltage so produced is amplified and limited by the voltage amplifier 8 which also acts as a limiter. The amplified quantity is applied to control the power amplifier 9, which, in turn, controls the rotation and direction of rotation of the reversible electrical motor 5. As noted, motor 5 operates to adjust the angular position of the condenser plate 4 relatively to the condenser plate 2 for accomplishing the follow-up or rebalancing operations of the apparatus, and accordingly, for adjusting the position of the condenser plate 4 in angular correspondence with the position of the condenser plate 2.

The rectifier 15 and the voltage amplifier and limiter 8, while shown separately in Fig. 1, may desirably be contained within the same envelope. To this end the rectifier 15 and the voltage amplifier and limiter 8 may each comprise one section of a commercially available type 7N7 tube which contains two similar triodes within the same envelope. The rectifier 15 includes an anode 19, a control grid 20, a cathode 21, and a heater filament 22. The terminals of the heater filament 22 are connected to transformer secondary winding 16 and the grid 20 is connected to the cathode 21. A filter generally designated at 23 is associated with the rectifier 15 for producing a D. C. potential substantially free from ripple for energizing the output circuit of the voltage amplifier and limiter 8. As shown, the filter 23 includes a pair of condensers 24 and 25 and a resistance 26. The rectifier circuit may be traced from the left end terminal of the transformer secondary winding 17, as seen in the drawing, to the anode 19 of the rectifier 15, the cathode 21 and through the filter 23 back to the right end terminal of the secondary winding 17, which terminal is grounded at G.

The oscillator 6 may be of any well known type and for purposes of illustration is shown as being an electron coupled oscillator including a pentode tube 27. The tube 27 may be of the commercially available type 6SJ7 and includes an anode 28, a suppressor grid 29, a screen grid 30, a control grid 31, a cathode 32, and a heater filament 33. The terminals of the filament 33 are connected to the transformer secondary winding 16. Control grid 31 is connected through a resistance 34 to ground G, and is also connected through a condenser 35 to one terminal of a parallel circuit including the condenser 1 in one branch, an inductance coil 36 in a second branch and a trimming condenser 37 in a third branch. This parallel circuit constitutes the frequency determining network of oscillator 6. The inductance coil 36 is inductively coupled to a coil 38 which, as shown, has one terminal connected to the lower terminal of the inductance coil 36 and has its other terminal directly connected to the cathode 32. Condenser 37 is employed for the purpose of providing a fine adjustment of the zero setting of the system. Preferably, the condenser 37 is provided with a suitable knob or kerf to facilitate adjustment thereof. Screen grid 30 is connected through a condenser 39 to ground G and through a resistance 40 to the left end terminal of the transformer secondary winding 17. Suppressor grid 29 is directly connected to ground G and is connected through the inductance coil 38 to the cathode 32. The suppressor grid 29 serves the usual purpose of decreasing secondary emission from the anode 28.

The oscillating circuit of the oscillator 6 includes the control grid circuit of which the frequency determining network including the condenser 1 forms a part and also includes the screen grid circuit which may be traced from the left end terminal of the transformer secondary winding 17 through resistance 40 to the screen grid 30, cathode 32, and inductance coil 38 to the grounded right end terminal of the secondary winding 17. The control grid and screen grid circuits are inductively coupled by the inductance coils 36 and 38 and are so arranged as to provide high frequency operation about a center frequency which, for purposes of explanation, may be assumed to be 450,000 cycles per second.

Inasmuch as alternating voltage is applied to the screen grid 30 from the transformer secondary winding 17, high frequency oscillations are produced by the oscillator 6 only during alternate half cycles of the supply line voltage, namely, those half cycles during which the screen grid 30 is rendered positive in potential with respect to the potential of the cathode 32. For convenience of explanation, these alternate half cycles are referred to hereinafter as the operative half cycles.

The screen grid 30 and transformer secondary winding 17 are so utilized that the high frequency oscillations in the output circuit of the oscillator 6 assume their maximum amplitude near the beginning of each cycle of the alternating supply voltage and continues at maximum amplitude until near the end of each operative half cycle. In other words, the envelope of the high frequency oscillations assumes an approximately square wave form. Resistance 40 included in the screen grid circuit assists in the attainment of such operation and acts as a limiter to prevent the screen grid voltage from increasing beyond a predetermined value. In this manner the screen grid voltage is made to assume an approximate square wave form during the operative half cycles of the alternating supply voltage. Accordingly, the high frequency oscillations produced by the oscillator 6 are maintained at an approximately constant amplitude during the operative half cycles of the alternating supply voltage and are substantially zero during the other half cycles of the alternating supply voltage.

Amplitude modulation of the high frequency oscillations produced in the output circuit of the oscillator 6 obtained in the foregoing manner has been found to be adequate for many uses of the present invention. When it is desired to obtain amplitude modulation more closely approximating a square wave envelope, however, other methods such as those disclosed in the aforementioned application of R. F. Wild may be employed. These methods of obtaining amplitude modulation more closely approaching a square wave envelope do not constitute any part of the present invention and, therefore, further explanation thereof is believed unnecessary.

The anode 28 of the oscillator pentode tube 27 is electron coupled to the screen grid 30 so that the high frequency oscillations occuring during the operative half cycles of the low frequency alternating supply voltage cause the voltage of the anode 28 to oscillate at the same high frequency during those operative half cycles. The high frequency oscillating circuit for the anode 28 may be traced from the cathode 21 of the rectifier 15 through the primary winding 41 of an intermediate frequency transformer 42 to the anode 28, screen grid 30 and condenser 39 to ground G. A condenser 43 is connected in parallel with the primary winding 41 for tuning the latter to the center frequency, 450,000 cycles per second, of the oscillations in the output circuit of oscillator 6.

The frequency discriminating means 7 includes the intermediate frequency transformer 42 and a pair of diode rectifiers 44 and 45 which desirably may be contained within a single envelope generally designated at 46. The intermediate frequency transformer 42 includes a split secondary winding in addition to the primary winding 41. One half of the split secondary winding has been designated by the numeral 47 and the other half by the numeral 48. The center tap of the split secondary winding is connected through a blocking condenser 49 to the anode 28 of the pentode tube 27 and is also connected to the upper terminal of the primary winding 41. The center tap of the split secondary winding is also connected to the point of engagement of a pair of resistances 50 and 51. If desired, an inductance coil or choke may be inserted in the last mentioned connection. The useful output voltage from the frequency discriminator 7 is obtained across the resistances 50 and 51 between the terminals 52 and 53.

Diode rectifiers 44 and 45 may be contained within a single tube such as the commercially available type 6H6. As shown, the diode 44 includes an anode 54, a cathode 55 and a heater filament 56. The diode 45 similarly includes an anode 57, a cathode 58 and a heater filament 59. The heater filaments 56 and 59 are connected in series with each other to the terminals of the transformer secondary winding 16. The cathode 55 is connected through the resistance 50 to the center tap of the split secondary winding of the transformer 42, and the cathode 58 is also so connected through the resistance 51. The anode 54 is connected to the end terminal of the secondary winding section 47 and the anode 57 is connected to the end terminal of the secondary winding section 48. A condenser 60 is connected across the split secondary winding for tuning the latter to the center frequency, 450,000 cycles per second, about which the high frequency current output of the oscillator 7 is adapted to be varied. A condenser 61 is connected between the output terminals 52 and 53 of the discriminator 7. The blocking condenser 49 and the condenser 61 are so selected as to provide low impedance to the high frequency oscillations flowing through them. The condenser 43 and the transformer primary winding 41 are so chosen as to provide high impedance in order to produce a large output signal from the discriminator. Preferably, the primary winding 41 is tuned to the same frequency as the split secondary winding.

When the frequency of the oscillating current applied to the transformer primary winding 41 is 450,000 cycles per second, the value to which the primary winding 41 and the split secondary winding including sections 47 and 48 are resonant, the voltage induced in the winding sections 47 and 48 and appearing across the terminals of the split secondary winding will be 90° out of phase with the applied primary voltage. This voltage relationship is shown graphically in Fig. 2 wherein the vector $E_{41}$ represents the voltage applied to the primary winding 41 and the vectors $E_{47}$ and $E_{48}$ respectively represent the voltages appearing across the split secondary winding sections 47 and 48. The phenomena giving rise to the 90° phase shift between the secondary and primary voltages is one known in the art and results from the fact that in a transformer, the secondary winding of which is resonant, a phase shift of 90° occurs between the primary and secondary voltages.

Figure 2:
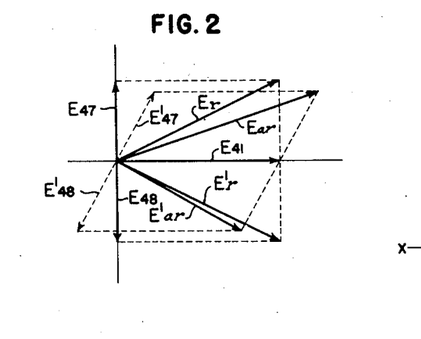
Figs. 2, 3, 6, 7 and 8 are graphs illustrating the operation of the arrangement of Fig. 1.

The secondary winding sections 47 and 48 are so wound on the transformer 42 that the voltage appearing across the winding 47 is 180° out of phase with the voltage appearing across the winding 48. As may be seen by reference to Fig. 1, the voltage appearing across the secondary winding 47 is impressed on the circuit including the diode rectifier 44 and the resistance 50 while the voltage appearing across the secondary winding 48 is impressed on the circuit including the diode 45 and the resistance 51. Superimposed on each of these voltages is the voltage developed across the primary winding 41. This primary voltage is superimposed on each of the voltages produced in the secondary winding sections 47 and 48 inasmuch as the upper terminal of the primary winding 41 is connected through the blocking condenser 49 to the point of engagement of the secondary winding sections 47 and 48. Consequently, the resultant voltage impressed on the circuit including the diode 44 is the vector sum of the secondary voltage $E_{47}$ and the primary voltage $E_{41}$, which vector sum is represented in Fig. 2 by the vector $E_r$. The vector $E'_r$ in Fig. 2 represents the resultant voltage impressed on the circuit including the diode 45. The absolute values of the primary and secondary voltages in relation to each other are not critical and may be selected as desired.

As those skilled in the art understand, the 90° phase relationship between the voltage applied to the primary winding 41 and the voltages appearing across the secondary winding sections 47 and 48 occurs only when the applied frequency to the primary winding 41 is the value to which the split secondary winding is resonant. Upon departure of the applied frequency from this value the voltages appearing across the secondary winding sections 47 and 48 also depart from the 90° phase relationship with the primary winding applied voltage, as may be seen by reference to rectors $E'_{47}$ and $E'_{48}$ in Fig. 2. For example, upon increase in the applied frequency from the value to which the secondary winding is resonant the phase displacement between the voltage appearing across the secondary winding section 47 and the applied primary voltage decreases toward zero while the phase displacement between the voltage appearing across the secondary winding section 48 and the primary voltage increases toward 180°. Upon decrease in the applied frequency the converse is true. In such case, the phase displacement between the vectors $E_{47}$ and $E_{41}$ of Fig. 2 will increase toward 180° while the displacement between the vectors $E_{48}$ and $E_{41}$ decreases toward zero. Accordingly, when the applied frequency deviates from the value to which the secondary winding is resonant the voltage appearing across one of the secondary winding sections 47 and 48 will be more nearly in phase with the primary voltage, while the voltage across the other secondary winding section will be more out of phase with the primary voltage.

As a consequence, when the applied frequency to the primary winding 41 deviates slightly from the value to which the secondary winding is tuned, the magnitude of the resultant voltage applied to one of the diodes 44 or 45 will increase as may be seen by reference to the vector $E_{ar}$ in Fig. 2 while the magnitude of the resultant voltage applied to the other diode will decrease as is indicated by the vector $E'_{ar}$. Upon greater deviation in the applied frequency in the same direction from the value to which the secondary winding is resonant, the resultant voltage applied to the first mentioned diode will continue to increase, while the voltage applied to the second mentioned diode will decrease. As the deviation in the applied frequency in the same direction becomes greater, however, the voltage applied to the first mentioned diode will increase until a maximum value is reached and upon still greater frequency deviation will also begin to decrease, as may be seen by reference to Fig. 3 wherein the curve $er$ represents the manner in which the resultant voltage across the resistance 50 changes upon variation in the applied frequency and the curve $e'r$ represents the manner in which the resultant voltage across the resistance 51 simultaneously changes.

Figure 3:
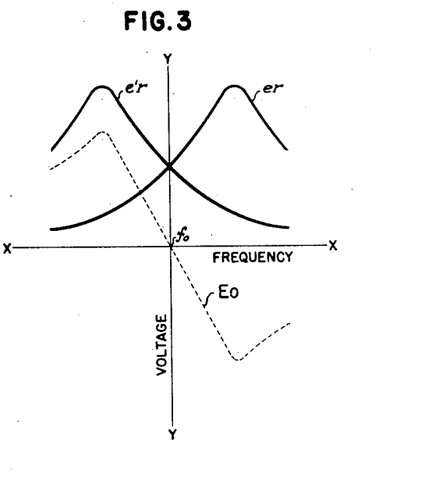

By reference to Fig. 3 it will be noted that the resultant voltage $er$ across the resistance 50 will increase initially as the aplied frequency increases from the value $f_0$ to which the secondary winding of the transformer 42 is resonant, until it reaches a maximum value following which it will begin to decrease as the applied frequency is further changed in the same direction. Concurrently, the resultant voltage applied to the other diode 45 will decrease and continue gradually to decrease as the applied frequency deviates further from the resonant value. As a result of this action the voltage drop produced across the resistance 50 will be increased while that across the resistance 51 decreased.

Upon deviation in the frequency of oscillation of the oscillating current in the output circuit of the oscillator 6 in the opposite direction from the value to which the secondary winding of the transformer 42 is resonant, the resultant voltage across the resistance 50 will decrease while the resultant voltage across the resistance 51 will increase to a maximum value, following the attainment of which it will also begin to decrease.

The manner in which the resultant of the voltage drops across the resistances 50 and 51, namely that appearing between terminals 52 and 53, changes in amplitude with variation in the applied frequency is illustrated in Fig. 3 by the curve $E_o$. At the point of intersection of curve $E_o$ with the $x$—$x$ axis the voltage drops across the resistances 50 and 51 are equal. The portion of the curve $E_o$ to the right of the $y$—$y$ axis represents the difference in voltage drops across the resistances 50 and 51, the voltage drop across resistance 50 being the greater and occurring upon an increase in the applied frequency. The portion of the curve $E_o$ to the left of the $y$—$y$ axis represents the difference in magnitudes of the voltage drops across the resistances 50 and 51, the voltage drop across the resistance 51 being the greater and occurring upon a decrease in the applied frequency. It will be noted that within a predetermined range the amplitude of the resultant of the voltage drops across the resistances 50 and 51 and appearing between the discriminator output terminals 52 and 53 is substantially linearly proportional to the frequency deviation from the value to which the discriminator is tuned.

The curve $E_o$ shown in Fig. 3 is that obtained with the arrangement of Fig. 1 when a linear relationship exists between angular movement of the condenser plate 2 relatively to the condenser plate 4 and the resulting shift in frequency of the high frequency oscillating current in the output circuit of the oscillator 6. That is to say, adjustment through a given angle of the condenser plate 2 relatively to the condenser plate 4 produces the same change in the frequency of oscillation of the high frequency oscillations in the output circuit of the oscillator 6 regardless of the relative positions of the condenser plates 2 and 4.

As a consequence of the linear relationship between angular deviation between the condenser plates 2 and 4 and the coresponding change in frequency of oscillation of the high frequency oscillating currents in the output of the oscillator 6, maximum sensitivity of the system is obtained in the vicinity of the point where the curve E₀ of Fig. 3 passes through zero, or in other words, in the vicinity of the balanced point of the system. The atainment of maximum sensitivity in this vicinity, while desirable for some purposes, is undesirable for other purposes and acts together with the inertia of the rotating element or rotor of the follow-up motor 5 to establish a condition favoring over-shooting of the balanced point as the motor 5 adjusts the angular position of the condenser plate 4 to correspond with that of the condenser plate 2. Since the discriminator 7 is most sensitive to a change of frequency of the applied oscillations thereto in the vicinity of the balanced point, such over-shooting produces a strong motor driving action in the reverse direction. Accordingly, there is a tendency for the occurrence of sustained chattering of the rotating element or rotor of the motor and the parts driven thereby.

Figure 4:
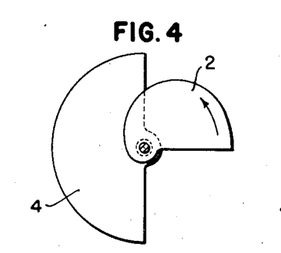
Figs. 4 and 5 are plan and side views, respectively, of one specific construction of the follow-up condenser of Fig. 1 having utility for eliminating or minimizing chattering when the condenser members rotate in one direction only.
Figures 5, 10:
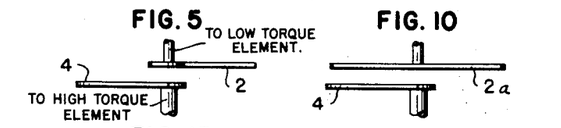
Figs. 9 and 10 show plan and side views, respectively, of a modified construction of the follow-up condenser of Fig. 1 which may be employed to eliminate or minimize chattering regardless of the direction of rotation of the condenser members.
Figure 6:
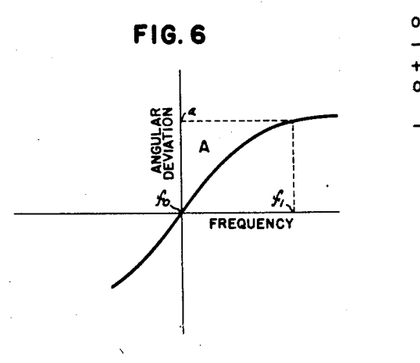

According to the present invention the tendency for the occurrence of over-shooting, and consequently chattering, is eliminated or at least minimized by reducing the sensitivity of the system in the vicinity of the balanced point and by increasing the system sensitivity as the deviation in the applied frequency to the discriminator increases from the value to which the discriminator is tuned. Such reduction in the sensitivity of the system in the vicinity of the balanced point is obtained by properly configuring the follow-up condenser 1 so that a non-linear relationship, such for example, as is shown in Fig. 6, exists between angular departure of the condenser plates 2 and 4 from the relative positions wherein the system is balanced and the corresponding shift in frequency of the high frequency oscillations in the output circuit of the oscillator 6 and applied to the input terminals of the frequency discriminator 7. To the attainment of this end the condenser plates 2 and 4 may desirably be configured and cooperatively associated with each other as shown in Figs. 4 and 5. When the condenser plates 2 and 4 are so configured and associated, the relationship between angular deviation in the position of the condenser plates 2 and 4 from the positions in which the system is balanced and the resulting shift in frequency of the high frequency oscillations in the output circuit of the oscillator 6 is as shown in Fig. 6.

The condenser plate 2, as seen in Fig. 4, is so shaped that its radius increases with increasing angle of deviation from a predetermined radial line, which line for example may be assumed to be the lower straight edge of condenser plate 4. Those skilled in the art will recognize that the capacity of this structure does not increase uniformly when the condenser plate 2, actuated by the low torque element 3, is rotated in the direction indicated by the arrow, but first increases slowly and then increasingly more rapidly so that the rate of change of capacity varies with the angle of rotation.

Obviously, when a condenser 1 of this construction is connected in parallel relation with the inductance element 36 and condenser 37 to form a parallel resonant circuit, the frequency of the oscillator 6 changes more rapidly with increasing angle of rotation of the low torque element 3. Consequently, the rate of change of frequency increases with increasing angle of rotation, and therefore, with increasing deviation from the balanced point.

It is noted that since the amplitude of the voltage derived between the output terminals 52 and 53 of the discriminator 7 is substantially linearly proportional, in the vicinity of the balanced position of the system, to the extent of frequency deviation of the frequency of oscillation of the oscillator 6 from the value to which the discriminator 7 is tuned, the resultant voltage obtained between terminals 52 and 53 for small deviations from the balanced point will be lower for a given angular adjustment of condenser plate 2 relatively to plate 4 if the rate of change of frequency in the vicinity of the balanced point is decreased. Accordingly, the shaping of the condenser plate 2, as shown, tends to reduce the excessive sensitivity of the system in the vicinity of the balanced point, and therefore, provides a means for eliminating or at least minimizing chatter of the rotating element of the motor and the parts driven thereby.

By referring to Fig. 6 it will be noted that upon small angular departures of the condenser plates 2 and 4 from the positions in which the system is balanced the variations in frequency of the high frequency oscillations in the output circuit of the oscillator 6 are effected at a relatively low rate as the angular deviation changes from zero to the point a. Upon further angular deviation, the variations in frequency in the high frequency oscillations occur at a higher rate for the same angular change in the relative positions of the condenser plates 2 and 4. The reason for such a non-linear relationship will be apparent from the disclosures of Figs. 4 and 5, inspection of which is sufficient alone to indicate that a given clockwise angular adjustment of the condenser plate 2 relatively to the plate 4 from the position shown will produce a smaller change in capacitance between the condenser plates 2 and 4 than will be produced when the condenser plate 2 is rotated in a counter-clockwise direction from the position shown. It will be apparent that the shape of curve A in Fig. 6 may be varied as desired by proper configuration and association of condenser plates 2 and 4.

Figure 7:
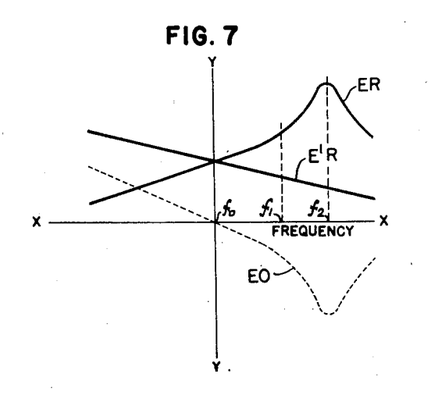

The manner in which the voltage drops across the resistances 50 and 51 change with variation in the applied frequency, when the condenser plates 2 and 4 are configured as shown in Figs. 4 and 5, is illustrated in Fig. 7, wherein the curve ER represents the manner in which the voltage across the resistance 50 changes upon deviation in the applied frequency to the discriminator from the value to which the discriminator is tuned, and the curve E'R represents the manner in which the voltage produced across the resistance 51 changes concurrently. The resultant of the voltages across the resistances 50 and 51 and appearing between the terminals 52 and 53 is illustrated in Fig. 7 by the curve EO.

At the point of intersection of the curve EO with the x—x axis the voltage drops across resistances 50 and 51 are equal and the portion of the curve EO to the right of the y—y axis represents the difference in voltage drops across the resistances 50 and 51 when the voltage drop across the resistance 50 is the greater. The portion of curve EO to the left of the y—y axis represents the difference in the magnitudes of the voltage drops across the resistances 50 and 51 when the voltage drop across the resistance 51 is the greater.

By referring to Fig. 7 it will be noted that the slope of the curve EO in the vicinity of the balanced point of the system is appreciably smaller than the slope of the curve $E_0$ in the corresponding vicinity in Fig. 3. The significance of this decreased slope of the curve EO in the vicinity of the balance point in Fig. 7 is that the system having the characteristic shown in Fig. 7 is appreciably less sensitive in the vicinity of the balanced point than it is upon greater unbalanced conditions. Thus in Fig. 7 the slope of the curve EO is relatively small as the applied frequency to the discriminator varies from $f_0$, the value to which the discriminator is tuned, to the frequency $f_1$. As the applied frequency further departs in the same direction from the value $f_1$ to the value $f_2$, the slope of the curve EO becomes appreciably greater, and accordingly, the sensitivity of the system then is increased correspondingly greater. Therefore, the sensitivity of the system in the vicinity of the balanced point is effectively reduced without causing a corresponding reduction in sensitivity of the system upon increased deviation from the balanced point.

In this manner the tendency for the follow-up motor 5 to over-shoot the balanced point of the system as it effects a follow-up adjustment of the condenser plate 4 is eliminated, or at least minimized, and a corresponding reduction in the tendency for the occurrence of chattering or mechanical oscillation of the rotating element of the motor and the parts driven thereby is accomplished. It is contemplated that the condenser plate 2 may be so shaped and spaced relatively to the condenser plate 4 that the sensitivity of the system in the vicinity of the balanced point may be made the greatest possible value consistent with the elimination of the tendency of overshooting and consequent chattering to occur.

Inasmuch as the high frequency oscillating current applied to the primary winding 41 of the discriminator is modulated at the frequency of the current supplied by the supply lines L' and L'', the voltage drops which are produced across the resistances 50 and 51 will only be produced thereacross during the regularly recurring intervals when high frequency currents flow from the output circuit of the oscillator 6 to the frequency discriminator 7. When no high frequency currents are applied to the primary winding 41 no voltage difference is created across either of the resistances 50 and 51.

Accordingly, there are two conditions in which the resultant of the voltages across resistances 50 and 51 and impressed across the output terminals 52 and 53 is zero. The first condition is that in which no high frequency currents are applied to the primary winding 41 of the discriminator 7. The second is that occurring when the frequency of the high frequency currents applied to the discriminator 7 is the value to which the secondary winding of the discriminator is tuned.

As was noted previously, high frequency currents are applied to the discriminator 7 only during alternate half cycles of the alternating current voltage derived from the supply lines L' and L''. Consequently, when the frequency of the high frequency currents applied to the discriminator 7 is the value, 450,000 cycles per second, to which the discriminator split secondary winding is tuned, no voltage drop is created between the terminals 52 and 53 during the operative half cycles of the alternating voltage supplied by the lines L' and L''. During the other half cycles of the alternating supply voltage no high frequency currents are applied to the input circuit of the discriminator 7 and in this case also no voltage drop is produced between the output terminals 52 and 53. Therefore, when the frequency of the high frequency oscillations applied to the discriminator corresponds to the value to which the discriminator is tuned, the potential of the terminal 52 remains the same as that of the terminal 53.

When the frequency of the high frequency currents applied to the discriminator 7 from the oscillator 6 increases above 450,000 cycles per second, the value to which the split secondary winding of the discriminator is resonant, a potential drop of the polarity rendering the terminal 52 positive with respect to the terminal 53 is created across the resistances 50 and 51 during the operative half cycles of the alternating voltage supplied by the lines L' and L''. During the other half cycles no high frequency currents are applied to the discriminator 7, and therefore, the potentials at the terminals 52 and 53 are identical. As a result an undulating or pulsating voltage is created between the terminals 52 and 53 upon increase in the frequency of the oscillation of the high frequency currents applied to the discriminator 7 and that undulating voltage is of one phase or of opposite phase with respect to the voltage of supply lines L' and L''. For purposes of illustration, the said undulating voltage may be assumed to be in phase with the voltage of the supply lines L' and L'', as is shown in Fig. 8, wherein the curve $E_s$ represents the supply line voltage and the curve $E_i$ represents the output voltage of the discriminator 7 appearing between terminals 52 and 53.

Upon decrease in the frequency of oscillation of the high frequency currents applied to the discriminator 7 from the oscillator 6, a pulsating voltage of opposite phase is produced between the terminals 52 and 53. Specifically, on such occurrence, the voltage drop across the resistance 51 will become greater than that across the resistance 50 to render the potential of the terminal 53 positive with respect to that of the terminal 52 during the operative half cycles of the voltage of the supply lines L' and L''. During the other half cycles no high frequency currents are impressed on the discriminator 7, and therefore, the potentials at the terminals 52 and 53 will be identical. Accordingly, an undulating voltage is produced between the terminals 52 and 53 which is 180° out of phase with the voltage of the supply lines L' and L''. This voltage output from the discriminator is represented in Fig. 8 by the curve $E_d$.

Figure 8:
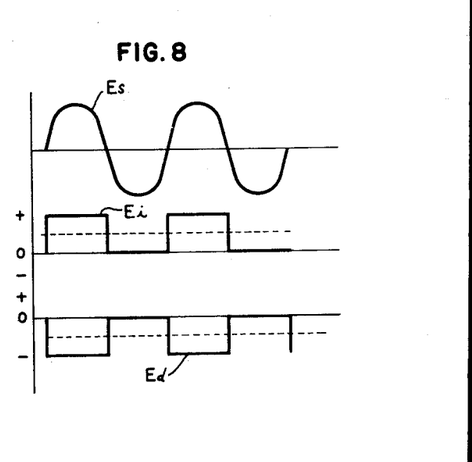

The curves $E_i$ and $E_d$ of Fig. 8 are intended to merely illustrate the phase relation with respect to the voltage of the supply lines L' and L'' of the voltage created between the discriminator output terminals 52 and 53. Those skilled in the art will readily recognize that when the condensers 2 and 4 are configured as shown in Figs.

4 and 5 of the amplitude of the voltage $E_1$ produced between the output terminals 52 and 53 of the discriminator 7 upon increase in the applied frequency will gradually increase as the applied frequency shifts from the frequency value $f_0$ to the frequency value $f_1$, as seen in Fig. 7, and will increase at a greater rate as the applied frequency shifts from the value $f_1$ to the value $f_2$.

As shown in Fig. 1 the voltage amplifier and limiter 8 comprises one section 62 of a twin type tube, for example a commercially available 7N7 tube, the other section of which comprises the rectifier 15. The section 62 includes an anode 63, a control grid 64, a cathode 65 and a heater filament 66 the terminals of which are connected to the transformer secondary winding 16.

The input circuit of the triode section 62 is controlled in accordance with the resultant voltage drop produced between the discriminator output terminals 52 and 53 and to this end the control grid 64 is connected directly to the terminal 52 and the terminal 53 is connected to the cathode 65 through a parallel cathode bias circuit including a resistance 67 in one branch and a condenser 68 in the other branch. Direct coupling is employed in preference to resistance-capacitance coupling in order to minimize distortion of the square wave characteristic of the discriminator output voltage, although resistance-capacitance coupling may be employed, if desired. It is noted that the cathode 65 is connected to ground G through the bias circuit 67, 68.

Anode voltage is supplied to the triode section 62 from the transformer secondary winding 17 through a circuit which may be traced from the left end terminal of the winding 17 to the anode 19 of rectifier 15, the cathode 21, through the resistance 26 of the filter 23, a resistance 69, the anode 63 of the triode section 62, the cathode 65 and the parallel connected resistance 67 and condenser 68 back to the other and grounded terminal of the transformer secondary winding 17.

The resistance 67 and condenser 68 serve to negatively bias the control grid 64 of the triode section 62 and are utilized for the purpose of maintaining the voltage of the control grid 64 at a predetermined means or average value when the undulating voltage output from the discriminator 7 is zero. This biasing circuit serves to provide the proper biasing potentials required for good amplification of small discriminator output or signal voltages. For discriminator output voltages in excess of a predetermined amplitude the triode section 62 acts as a limiter due to anode current saturation and cut off. By virtue of this limiting function the characteristic of the voltage output from the discriminator 7 of decreasing in amplitude following the attainment of a maximum value, as may be seen by reference to the curve $E_o$ of Fig. 3, and the curve $E_o$ of Fig. 7, is prevented from adversely affecting the operation of the system. For the most satisfactory operation the predetermined value of discriminator output voltage at which the limiting action of the triode 62 commences is preferably less than the smallest amplitude of the discriminator output voltage normally obtained as the amplitude of the said voltage decreases from its maximum value due to increases in the applied frequency greater than the frequency $f_2$ as seen in Fig. 7.

The power amplifier 9 comprises a twin triode tube 70 such as a type 7N7 tube. One triode 71 of the tube 70 includes an anode 72, a control grid 73, a cathode 74 and a heater filament 75 while the other triode 76 includes an anode 77, a control grid 78, a cathode 79 and a heater filament 80. The heater filaments 75 and 80 are connected in parallel to the transformer secondary winding 16. The control grids 73 and 78 are directly connected to each other and to a contact 81 which is in sliding engagement with a resistance 82. The resistance 82 is connected in series with a condenser 83 from the anode 63 of the voltage amplifier and limiter 8 to ground at G. The condenser 83 is provided for impressing the fluctuating component of the voltage produced across the resistance 69 in the anode circuit of the voltage amplifier and limiter 8 on the input circuit of the power amplifier 9 while preventing the D. C. component of the anode circuit voltage of the voltage amplifier and limiter 8 from being impressed on the input circuit of the power amplifier. The signal from the voltage amplifier and limiter is impressed simultaneously on both of the control grids 73 and 78 of the power amplifier 9. The adjustable resistance 82 and the associated contact 81 are provided to facilitate adjustment of the gain of the power amplifier 9.

Anode voltage is supplied to the triodes of the power amplifier 9 from the split secondary winding 18 provided on the transformer 12. Specifically, the anode 72 of triode 71 is connected to the left end terminal of the secondary winding 18 while the anode 77 is connected to the right end terminal of the winding 18. The cathodes 74 and 79 are connected together and through a biasing resistance 84 to ground G. The center tap on the split secondary winding 18 is connected to one terminal of the motor control winding 11 and the other terminal of the motor control winding is connected to ground G and therefore through the biasing resistance 84 to the cathodes 74 and 79 of the power amplifier 9. A condenser 85 is provided in parallel with the motor control winding 11 for tuning the latter.

When only the power winding 10 of the motor 5 is energized the rotor of the motor is not urged to rotation in either direction and remains stationary. When the control winding 11 is also energized and the voltage and current through it lead the voltage and current, respectively, in the power winding 10, the rotor of the motor is actuated for rotation in one direction, for example in a clockwise direction. When the voltage and current in the control winding 11 lag the voltage and current, respectively, in the power winding the rotor rotates in the opposite direction.

Energizing current is supplied to the power winding 10 of the motor 5 from the alternating current supply lines L' and L" through the switch 14 and through a circuit including a condenser 86 which is connected in series with the winding 10. The condenser 86 is so chosen with respect to the inductance of the power winding 10 as to provide a substantially series resonant circuit when the rotor is rotating at approximately full speed.

Power is supplied to the control winding 11 from the transformer secondary winding 18 through the anode circuits of the triodes 71 and 76 of the power amplifier 9. The condenser 85 connected in parallel with the control winding 11 is so selected as to provide a parallel resonant circuit during both the stalled and running conditions of the motor. The transformer split secondary winding 18 is so wound on the transformer 12 that the anode 72 of the triode 71 of the power amplifier 9 is driven positive during one half cycle of the alternating current supply voltage.

For convenience of explanation, this half cycle will be referred to as the first half cycle. The anode 77 of the triode 76 is driven positive during the alternate or second half cycles. Thus, during the first half cycle the anode 72 is positive with respect to the center tap on the secondary winding 18 and the anode 77 is negative with respect to the said center tap. During the second half cycle the anode 77 is rendered positive with respect to the potential of the transformer secondary winding center tap while the anode 72 becomes negative with respect to the potential of the center tap.

Accordingly, the triode 71 is adapted to be rendered conductive during one half cycle of the alternating voltage supplied by the supply lines L' and L'' and the triode 76 is adapted to be rendered conductive during the other half cycle. Inasmuch as the control grids 73 and 78 are directly connected together and the voltages of these control grids are identical, the power amplifier 9 produces pulses of current of equal magnitude through the control winding 11 during each half cycle of the supply line voltage when the system is balanced. Upon the production of an undulating voltage of one phase relatively to the supply line voltage at the output terminals 52 and 53 of the discriminator 7 as a result of a change in the relative positions of the condenser plates 2 and 4, the control grids 73 and 78 of the power amplifier 9 will be driven in the positive direction relatively to the potential of the cathodes 74 and 79 during one half cycle of supply line voltage and will be driven the negative direction during the other half cycle. Consequently, the anode current flow through one triode 71 or 76 during the half cycle that it is conductive will be increased while the anode current flow through the other triode during the alternate half cycle will be decreased. Thus, the pulses of current through the motor control winding 11 will be greater during one half cycle than during the other half cycle and as a result the rotor of the motor will be urged to rotation in one direction. Upon unbalance of the system in the opposite direction the opposite conditions as to the state of conductivity of the triodes 71 and 73 are obtained and as a result the motor rotor will be urged to rotation in the opposite direction.

The force urging the motor to rotation depends upon the relative conductivities of the triodes 71 and 76 of the power amplifier 9. Thus when the system is only slightly unbalanced and a pulsating voltage output of small amplitude is produced between the discriminator output terminals 52 and 53, the force urging the motor to rotation will be relatively small. Upon greater unbalance of the system and the creation of a pulsating voltage of larger unbalance between the discriminator output terminals 52 and 53, the force urging the motor to rotation will be correspondingly greater. This proportionality between the force urging the motor to rotation and the amplitude of the motor driving signal created by the discriminator exists as the frequency of oscillation of the high frequency oscillations of the output circuit of the oscillator 6 is varied between the values $f_o$ and the frequency value which produces a discriminator output voltage of sufficient amplitude to saturate the amplifier and limiter 8. Due to the action of the voltage amplifier and limiter 8, the amplitude of the fluctuation of the voltage applied to the control grids 73 and 78 of the power amplifier 9 does not increase for greater excursions of the oscillator output frequency from the value to which the discriminator 7 is tuned. In other words, when the frequency of oscillation of the oscillator 6 increases above 451,000 cycles per second, for example, the amplitude of fluctuation of the voltage applied to the grids 73 and 78 does not increase above the maximum value.

A more detailed description of the operation of the motor drive system is given in the aforementioned R. F. Wild application, and also in the copending application of Walter P. Wills, Serial Number 421,173, filed December 1, 1941, now Patent No. 2,423,540, issued July 8, 1947, therefore, further description thereof is not believed necessary herein.

Figure 9:
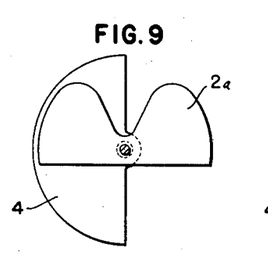

In Figs. 9 and 10 we have illustrated more or less diagrammatically a modified construction of the follow-up condenser 1 of Fig. 1 which is operative, when employed, to eliminate, or at least minimize, chattering of the rotatable element of the motor 5 and the parts driven thereby when the condenser members rotate in either direction. As has been previously noted, when a follow-up condenser of the construction shown in Figs. 4 and 5 is utilized to effect energization of the motor 5 for rotation in both directions, that condenser construction is operative to eliminate or minimize chattering when the condenser members rotate in one direction only, namely the direction indicated by the arrow in Fig. 4. The modified condenser construction shown in Figs. 9 and 10 provides this desirable and advantageous feature of eliminating or minimizing chattering irrespective of the direction in which the condenser members are rotating.

In the modified condenser construction shown in Figs. 9 and 10 a condenser plate 4 mechanically connected to and driven by the motor 5 is provided which may be identical in shape to the condenser plate 4 shown in Figs. 4 and 5. The condenser plate driven by the low torque element 3, however, is of different shape than the plate 2 shown in Fig. 4 and has been indicated by the reference character 2a. With a condenser plate 2a of the shape shown, the capacity between the condenser plates 2a and 4 does not increase uniformly when the condenser plate 2a is rotated in one direction or the other relatively to the plate 4 from the position in which the system is balanced, but increases slowly at first and then increasingly more rapidly. In other words, the rate of change of capacity increases with the angle of rotation of the condenser plate 2a relatively to the plate 4 from the position shown. Accordingly, when a condenser of the construction shown in Figs. 9 and 10 is connected in parallel relation with the inductance element 36 in the frequency determining circuit of the oscillator 6, the rate of change of the frequency of the high frequency oscillating current generated by the oscillator 6 increases with increasing angle of rotation of the condenser plate 2a from the position shown and, therefore, with increasing deviation from the balanced point, assuming that the spacial relation between the condenser plates 2a and 4 which exists when the system is balanced is approximately that shown in Figs. 9 and 10.

Inasmuch as the motor drive signal created between the output terminals 52 and 53 of the frequency discriminator 7 is substantially linearly proportional to the frequency deviation of the high frequency oscillations generated by oscillator 6 from a predetermined value in the vicinity of the balanced position of the system, the amplitude of the motor driving signal obtained for a given small deviation from the balanced point when the plates of the follow-up condenser are so shaped and associated will be smaller than would otherwise be obtained when the rate of change of said frequency around the balance point is decreased as described. Therefore, the shaping of the condenser plate 2a and its association with the condenser plate 4 as shown in Figs. 9 and 10 tend to reduce the excessive and undesired sensitivity of the system in the vicinity of the balance point, and accordingly, eliminate or at least minimize chatter in the system.

Figure 11:
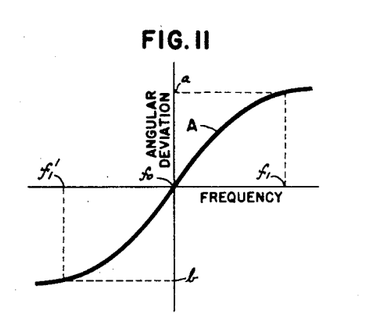
Figs. 11 and 12 are graphs illustrating the operation of the arrangement of Fig. 1 when a follow-up condenser of the type shown in Figs. 9 and 10 is employed.
Figure 12:
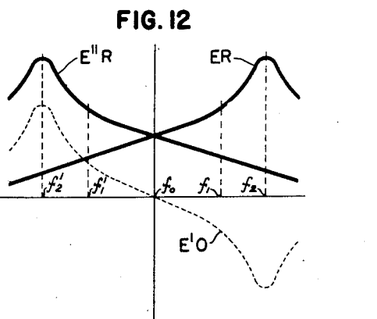

Figs. 11 and 12 illustrate graphically the operation of the frequency discriminating system of Fig. 1 when a follow-up condenser 1 of the construction shown in Figs. 9 and 10 is employed. Specifically, Fig. 11 shows the relationship between angular deviation of the condenser plate 2a relatively to the condenser plate 4 from the position shown and at which the system is balanced to the corresponding change in frequency produced in the high frequency oscillating current created by the oscillator 6. By referring to Fig. 11 it will be noted that as the angular deviation in one direction of the condenser plate 2a from the position shown increases to the point a the change in frequency of the high frequency oscillations created by the oscillator 6 is effected at a much lower rate than the frequency changes which are effected upon greater angular deviation of the condenser plate 2a from the point a. Similarly, upon deflection of the plate 2a in the opposite direction the change in frequency of the high frequency oscillations created by oscillator 6 are accomplished at a slower rate as the plate 2a moves from the position shown through the angle b and upon greater deflection the said changes in frequency are accomplished at a greater rate.

Fig. 12 illustrates the voltage drops created across the resistances 50 and 51 of the frequency discriminator 7 when a follow-up condenser of the construction shown in Figs. 9 and 10 is employed. Thus, the curve E'R shows how the voltage across the resistance 50 changes with angular departure of the condenser plate 2a in either direction from the position shown while the curve E"R shows how the voltage across the resistance 51 changes simultaneously. The curve E'O represents the resultant voltage produced between the output terminals 52 and 53 of the discriminator.

Figure 13:
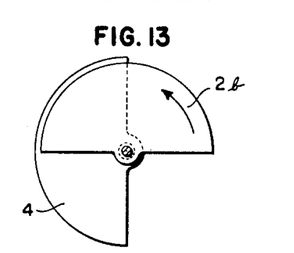
Figs. 13 and 14 show plan and side views, respectively, of a modification of the follow-up condenser of Figs. 4 and 5 for eliminating or minimizing chattering when the condenser members rotate in one direction only.
Figure 14:
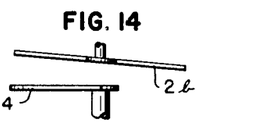

In Figs. 13 and 14 we have illustrated a modification of the condenser construction shown in Figs. 4 and 5 having utility for eliminating or minimizing chattering when the condenser members rotate in one direction only and in which the non-linearity in the rate of change of capacity is obtained by varying the spacing between the associated condenser plates rather than by relying solely upon a particular shape of one or the other or both of the condenser plates as in Figs. 4 and 5. As shown in Fig. 13, the condenser plate 4 is of the same general shape as the condenser plate 4 of Fig. 4, and the cooperating condenser plate driven by the low torque element 3 and designated by the reference character 2b is also of similar shape. The plate 2b is so mounted on the rotatable shaft of the low torque element, however, as to be inclined toward the condenser plate 4. Consequently, as the plate 2b rotates in the direction of the arrow relatively to plate 4, the capacity between the condenser plates 2b and 4 does not increase uniformly, but first increases slowly and then more rapidly so that the rate of change of capacity between the condenser plates changes with the angle of rotation. Therefore, the rate of change of frequency of the high frequency oscillations generated by oscillator 6 increases with increasing angle of rotation, or in other words, with increasing deviation from the balanced point. As a result the excessive sensitivity of the system in the vicinity of the balanced point is reduced and the tendency for the occurrence of chattering of the rotatable element of the motor and the parts driven thereby is eliminated or minimized.

Figure 15:
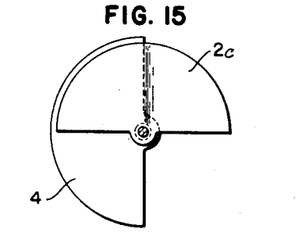
Figs. 15 and 16 show plan and side views, respectively, of a modification of the follow-up condenser of Figs. 13 and 14 for eliminating or minimizing chattering regardless of the direction of rotation of the condenser members.
Figure 16:
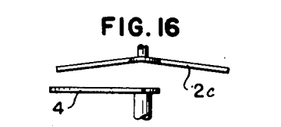

Figs. 15 and 16 illustrate a modification of the condenser construction shown in Figs. 13 and 14 for eliminating or minimizing chattering of the rotatable element of the motor and the parts driven thereby regardless of the direction of rotation of the condenser plates. As shown in Fig. 15 the shape of the condenser plate 4 is similar to that of the correspondingly identified part of Figs. 4 and 13 and the condenser plate 2c driven by the low torque element 3 is also of similar shape as seen in the plan view of Fig. 15 but as shown in Fig. 16 is bent so as to incline in opposite directions toward the condenser plate 4. As a result, when the plate 2c is rotating in one direction, for example in the clockwise direction, to decrease the capacity between the plates 2c and 4 the capacity between these plates does not decrease uniformly but first decreases slowly and then decreases more rapidly so that the rate of change of capacity changes with the angle of rotation. Upon rotation of the condenser plate 2c in the opposite direction to increase the capacity between the condenser plates the capacity does not increase uniformly but first increases slowly and then increasingly more rapidly.

By so configuring the condenser plate 2c and associating it with condenser plate 4, the excessive sensitivity of the system in the vicinity of the balanced point is reduced, and accordingly, the tendency for the occurrence of chattering is eliminated or minimized.

Figure 17:
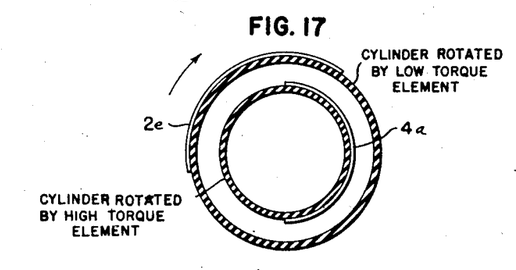
Fig. 17 shows a plan view of a further construction which may be employed to eliminate or minimize chattering when the condenser members rotate in one direction only.
Figure 18:
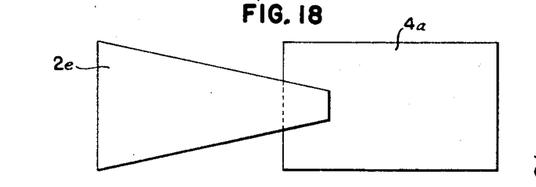
Fig. 18 shows the development of the condenser members of the condenser which, as shown in Fig. 19, are mounted on relatively rotatable concentric cylinders of insulating material.

In Figs. 17 and 18 we have illustrated, more or less diagrammatically, a modified construction for the follow-up condenser 1 of Fig. 1 in which the condenser plates driven by the low and the high torque elements comprise suitable sections of cylindrical surfaces. The surface area of the condenser plate rotated by the high torque element and indicated at 4a is essentially rectangular while that of the condenser plate rotated by the low torque element 3 and indicated at 2e is essentially wedge shaped so that the capacity between the condenser plates is increased at an increasingly rapid rate for increasing deviation of the low torque element from the balance point, assuming that the system is balanced for a relatively small amount of capacity between the low and high torque elements. This modified condenser construction, therefore, has utility for eliminating or minimizing chattering when the condenser members are rotated in one direction only, for example, that indicated by the arrow in Fig. 17.

Although single plates only have been shown for the condenser members of the follow-up condenser 1 in the various modified condenser constructions disclosed, it will be understood that any desired number of these condenser members or plates can be arranged to form a follow-up condenser in the manner conventional in the design of rotary tuning condensers.

While in accordance with the provisions of the statutes, this invention has been illustrated and described in the best form now known, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described our invention, what we claim as new and desire to secure by Letters Patent, is:

1. In a torque amplifying apparatus including tuning means adapted to be adjusted in accordance with the position of a controlling object and the position of a controlled object, an oscillator having a frequency determining circuit associated with said tuning means and having an output circuit in which there is adapted to appear a signal having a frequency dependent upon the adjustment of said tuning means, frequency discriminating means having an input circuit coupled to the output circuit of said oscillator and having an output circuit, and motor drive means coupled to the output circuit of said discriminating means and responsive to the frequency of said signal, said motor drive means being operative to position the controlled object in accordance with the position of the controlling object to bring the controlled and controlling objects into a position of correspondence, and tending to chatter when the controlled object closely approaches said position of correspondence, due to mechanical inertia and to the high sensitivity of the apparatus when at or closely approaching said position of correspondence, the improvement comprising a non-linear, two-part variable reactance device included in said tuning means and including first and second non-linearly cooperating elements electrically connected to said frequency determining circuit and exhibiting an increasing rate of change of reactance upon relative movement at a substantially uniform rate from a position corresponding to said position of correspondence, said tuning means also including mechanical linkages through which the controlling and controlled objects are adapted, respectively, to position relatively said first and second elements, whereby the rate of change of frequency of the oscillator output signal and the high sensitivity of the apparatus are decreased as said position of correspondence is closely approached, and said tendency to chatter is minimized.

2. Apparatus as specified in claim 1, wherein said motor drive means includes a reversible, rotating field electric motor including a rotor having appreciable mechanical inertia.

3. Apparatus as specified in claim 1, wherein said elements of said reactance device exhibit said increasing rate of change of reactance only when moved in one direction from said position corresponding to said position of correspondence.

4. Apparatus as specified in claim 1, wherein said elements of said reactance device exhibit said increasing rate of change of reactance when moved in either direction from said position corresponding to said position of correspondence.

5. Apparatus as specified in claim 1, wherein said variable reactance device is a condenser having two relatively rotatable plates, and wherein each of said elements consists of a respective one of said plates.

6. Apparatus as specified in claim 1, wherein said variable reactance device is a condenser having two parallel, relatively rotatable plates, wherein each of said elements consists of a respective one of said plates, and wherein the overlapping area of said parallel plates changes at an increasing rate upon relative rotation of said plates at a substantially uniform rate from a predetermined overlapping position corresponding to said position of correspondence.

7. Apparatus as specified in claim 1, wherein said variable reactance device is a condenser having two parallel plates which are relatively rotatable about the same axis, wherein one of said plates is provided with a curved edge the radius of curvature of which increases with increasing angle of deviation in one direction from a predetermined radial line, and wherein each of said elements consists of a respective one of said plates.

8. Apparatus as specified in claim 1, wherein said variable reactance device is a condenser having two parallel plates which are relatively rotatable about the same axis, wherein one of said plates is provided with a curved edge the radius of curvature of which increases with increasing angle of deviation in both directions from a predetermined radial line, and wherein each of said elements consists of a respective one of said plates.

9. Apparatus as specified in claim 1, wherein said variable reactance device is a condenser having two relatively rotatable plates which are inclined toward one another, and wherein each of said elements consists of a respective one of said plates.

10. Apparatus as specified in claim 1, wherein said variable reactance device is a condenser having two plates which are relatively rotatable about the same axis, wherein one of said plates is positioned to lie in a single plane and the other of said plates is inclined in opposite directions toward said plane from a straight line passing through said axis, and wherein each of said elements consists of a respective one of said plates.

11. Apparatus as specified in claim 1, wherein said variable reactance device is a condenser having two plates, wherein one of said plates comprises a rectangular portion of a first cylindrical surface and the other of said plates comprises a wedge shaped portion of a second cylindrical surface which is coaxial with said first cylindrical surface, said plates being relatively movable about the common axis of said first and second cylindrical surfaces, and wherein each of said elements consists of a respective one of said plates.

RUDOLF F. WILD.
ROBERT B. DARNIELLE.

REFERENCES CITED

The following references are of record in the file of this patent:

UNITED STATES PATENTS

| Number | Name | Date |
| --- | --- | --- |
| 1,838,084 | Drake | Dec. 29, 1931 |
| 2,126,910 | Moseley | Aug. 16, 1938 |
| 2,132,677 | Chance | Oct. 11, 1938 |
| 2,165,510 | Rosene | July 11, 1939 |
| 2,260,122 | Moore | Oct. 21, 1941 |
| 2,280,019 | Alexandersson et al. | Apr. 14, 1942 |
| 2,379,689 | Crosby | July 3, 1945 |
| 2,407,536 | Chapman | Sept. 10, 1946 |

FOREIGN PATENTS

| Number | Country | Date |
| --- | --- | --- |
| 102,887 | Sweden | Oct. 28, 1941 |